United States Patent
Eckel et al.

(10) Patent No.: US 6,740,695 B1
(45) Date of Patent: May 25, 2004

(54) FLAME RESISTANT POLYCARBONATE/ABS PLASTIC MOLDING MATERIALS

(75) Inventors: Thomas Eckel, Dormagen (DE); Michael Zobel, Düsseldorf (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/720,274

(22) PCT Filed: Jun. 12, 1999

(86) PCT No.: PCT/EP99/04060

§ 371 (c)(1), (2), (4) Date: Dec. 21, 2000

(87) PCT Pub. No.: WO00/00542

PCT Pub. Date: Jan. 6, 2000

(30) Foreign Application Priority Data

Jun. 26, 1998 (DE) .......................................... 198 28 541

(51) Int. Cl.⁷ ................................................. C08K 5/49
(52) U.S. Cl. ....................................... 524/121; 524/122
(58) Field of Search ................................ 524/121, 122, 524/123, 124

(56) References Cited

U.S. PATENT DOCUMENTS

| 5,194,477 A | * | 3/1993 | Liu et al. ..................... 524/382 |
| 5,912,321 A | | 6/1999 | Raith et al. .................. 528/399 |
| 6,020,081 A | | 2/2000 | Raith et al. .................. 428/704 |
| 6,060,583 A | | 5/2000 | Raith et al. .................. 528/488 |

FOREIGN PATENT DOCUMENTS

| DE | 2 755 384 | 6/1978 |
| EP | 417 839 | 3/1991 |
| EP | 728 811 | 8/1996 |
| WO | 97/40092 | 10/1997 |
| WO | 99/19383 | 4/1999 |

* cited by examiner

*Primary Examiner*—James J. Seidleck
*Assistant Examiner*—U. K. Rajguru
(74) *Attorney, Agent, or Firm*—Joseph C. Gil; Aron Preis; James R. Franks

(57) ABSTRACT

The present invention relates to polycarbonate/ABS moulding compositions with incorporated phosphazenes which exhibit excellent flame resistance and very good processing characteristics, wherein the graft polymer is produced by bulk, solution or bulk/suspension polymerization processes.

14 Claims, No Drawings

FLAME RESISTANT POLYCARBONATE/ABS PLASTIC MOLDING MATERIALS

The present invention relates to polycarbonate/ABS moulding compositions with incorporated phosphazenes which exhibit excellent flame resistance and very good processing characteristics, wherein the graft polymer is produced by bulk, solution or bulk/suspension polymerisation processes.

DE-A 196 16 968 describes polymerisable phosphazene derivatives, a process for the production thereof and the use thereof as curable binders for lacquers, coatings, fillers, surfacing compositions, adhesives, mouldings or films.

WO 97/400 92 describes flameproofed moulding compositions prepared from thermoplastic polymers and unsubstituted phosphazenes (of the type $PN_{n-x}H_{1-y}$).

EP-A 728 811 describes a thermoplastic blend consisting of aromatic polycarbonate, graft copolymer, copolymer and phosphazenes which exhibits good flameproofing properties, impact strength and heat resistance.

The object of the present invention is to provide polycarbonate/ABS moulding compositions having excellent flame resistance and excellent processing characteristics such as good flow behaviour and reduced formation of deposits on the mould during processing. This range of properties is required in particular for applications in data processing, such as for example casings for monitors, printers, copiers etc.

It has now been found that PC/ABS moulding compositions which contain phosphazenes in combination with diene rubber based graft polymer produced by bulk, solution or bulk/suspension polymerisation processes exhibit the desired properties.

The present invention accordingly provides thermoplastic moulding compositions containing A) 40 to 99, preferably 60 to 98.5 parts by weight of aromatic polycarbonate and/or polyester carbonate B) 0.5 to 60, preferably 1 to 40, in particular 2 to 25 parts by weight of graft polymer produced by bulk, solution or bulk/suspension polymerisation processes of B.1) 50 to 99, preferably 65 to 98 wt. % of one or more vinyl monomers on B.2) 50 to 1, preferably 35 to 2 wt. % of one or more grafting backbones having a glass transition temperature of <10° C., preferably of <0° C., particularly preferably of <−10° C., C) 0 to 45, preferably 0 to 30, particularly preferably 2 to 25 parts by weight of at least one thermoplastic polymer selected from the group comprising vinyl (co) polymers and polyalkylene terephthalates, D) 0.1 to 50, preferably 2 to 35, in particular 5 to 25 parts by weight of at least one component selected from the group comprising phosphazenes of the formulae

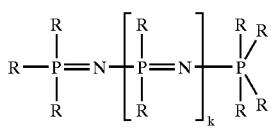

(Ia),

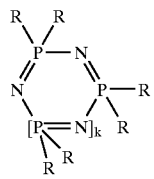

(Ib), in which

R is in each case identical or different and denotes amino, $C_1$ to $C_6$ alkyl, in each case optionally halogenated, preferably halogenated with fluorine, or $C_1$ to $C_8$ alkoxy, $C_5$ to $C_6$ cycloalkyl, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$-$C_4$-alkyl, in each case optionally substituted by alkyl, preferably $C_1$-$C_4$ alkyl, and/or halogen, preferably chlorine, bromine, k denotes 0 or a number from 1 to 15, preferably a number from 1 to 10, E) 0 to 5, preferably 0.1 to 1, particularly preferably 0.1 to 0.5 parts by weight of fluorinated polyolefin.

Component A

Component A aromatic polycarbonates and/or aromatic polyester carbonates which are suitable according to the invention are known from the literature or may be produced using processes known from the literature (c.f. in relation to the production of aromatic polycarbonates, for example Schnell, *Chemistry & Physics of Polycarbonates*, Interscience Publishers, 1964 and DE-AS 1 495 626, DE-OS 2 232 877, DE-OS 2 703 376, DE -OS 2 714 544, DE-OS 3 000 610, DE-OS 3 832 396; in relation to the production of aromatic polyester carbonates for example DE-OS 3 077 934).

Aromatic polycarbonates are produced for example by reacting diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using trifunctional or greater than trifunctional branching agents, for example triphenols or tetraphenols.

Diphenols for the production of the aromatic polycarbonates and/or aromatic polyester carbonates are preferably those of the formula (III)

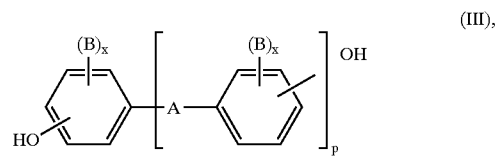

(III), wherein

A means a single bond, $C_1$-$C_5$ alkylene, $C_2$-$C_5$ alkylidene, $C_5$-$C_6$ cycloalkylidene, —O—, —SO—, —CO—, —S—, —SO$_2$—, $C_6$-$C_{12}$ arylene, onto which further aromatic rings optionally containing heteroatoms may be fused, or a residue of the formula (IV) or (V)

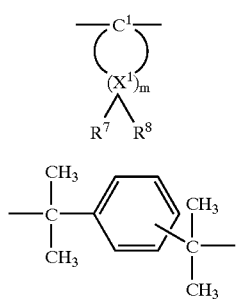

B in each case means $C_1$–$C_{12}$ alkyl, preferably methyl, halogen, preferably chlorine and/or bromine x in each case mutually independently mean 0, 1 or 2, p means 1 or 0 and $R^7$ and $R^8$ individually selectably, mutually independently for each $X^1$, mean hydrogen or $C_1$–$C_6$ alkyl, preferably hydrogen, methyl or ethyl, $X^1$ means carbon and m means an integer from 4 to 7, preferably 4 or 5, providing that $R^7$ and $R^8$ are simultaneously alkyl on at least one atom $X^1$.

Preferred diphenols are hydroquinone, resorcinol, dihydroxydiphenols, bis-(hydroxyphenyl)-$C_1$–$C_5$-alkanes, bis-hydroxyphenyl)-$C_5$–$C_6$-cycloalkanes, bis-(hydroxyphenyl)ethers, bis-(hydroxyphenyl)sulfoxides, bis-(hydroxyphenyl)ketones, bis-(hydroxyphenyl)sulfones and α,α-bis-(hydroxyphenyl)diisopropylbenzenes together with the ring-brominated and/or ring-chlorinated derivatives thereof. bis-hydroxyphenyl)sulfones and α,α-bis-(hydroxyphenyl)diisopropylbenzenes together with the ring-brominated and/or ring-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenyl sulfide, 4,4'-dihydroxydiphenyl sulfone together with the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

2,2-Bis-(4-hydroxyphenyl)propane (bisphenol A) is particularly preferred.

The diphenols may be used individually or as any desired mixtures.

The diphenols are known from the literature or are obtainable using processes known from the literature.

Chain terminators suitable for the production of the thermoplastic, aromatic polycarbonates are, for example, phenol, p-chlorophenol, p-tert.-butylphenol or 2,4,6-tribromophenol, as well as long-chain alkylphenols, such as 4-(1,3-tetramethylbutyl)phenol according to DE-OS 2 842 005 or monoalkylphenol or dialkylphenols having a total of 8 to 20° C. atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The quantity of chain terminators to be used is generally between 0.5 mol. % and 10 mol. %, relative to sum of moles of the diphenols used in each case.

The thermoplastic, aromatic polycarbonates have weight average molecular weights ($M_w$, measured for example by ultracentrifugation or light scattering) of 10000 to 200000, preferably of 20000 to 80000.

The thermoplastic, aromatic polycarbonates may be branched in a known manner, preferably by incorporating 0.05 to 2.0 mol. %, relative to the sum of diphenols used, of trifunctional or greater than trifunctional compounds, for example those having three and more than three phenolic groups.

Both homopolycarbonates and copolycarbonates are suitable. Component A copolycarbonates according to the invention may be produced by also using 1 to 25 wt. %, preferably 2.5 to 25 wt. % (relative to the total quantity of diphenols to be used) of polydiorganosiloxanes having hydroxy-aryloxy end groups. These are known (c.f. for example U.S. Pat. No. 3,419,634) or may be produced using processes known from the literature. The production of copolycarbonates containing polydiorganosiloxanes is described, for example, in DE-OS 3 334 782.

Preferred polycarbonates, apart from bisphenol A homopolycarbonates, are copolycarbonates of bisphenol A with up to 15 mol. %, relative to the sum of moles of diphenols, of other diphenols mentioned as preferred or particularly preferred, in particular 2,2-bis-(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and 2,6-naphthalenedicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used as a difunctional acid derivative in the production of polyester carbonates.

Chain terminators which may be considered for the production of the aromatic polyester carbonates are, apart from the above-mentioned monophenols, also the chlorocarbonic acid esters thereof and the acid chlorides of aromatic monocarboxylic acids, which may optionally be substituted by $C_1$–$C_{22}$ alkyl groups or by halogen atoms, together with aliphatic $C_2$–$C_{22}$ monocarboxylic acid chlorides.

The quantity of chain terminators is in each case 0.1 to 10 mol. %, relative, in the case of phenolic chain terminators, to the number of moles of diphenols and, in the case of monocarboxylic acid chloride chain terminators, to the number of moles of dicarboxylic acid dichlorides.

The aromatic polyester carbonates may also contain incorporated aromatic hydroxycarboxylic acids.

The aromatic polyester carbonates may be both linear and branched in a known manner (c.f. in this connection also DE-OS 2 940 024 and DE-OS 3 007 934).

Branching agents which may be used are, for example, tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in quantities of 0.01 to 1.0 mol. % (relative to dicarboxylic acid dichlorides used) or tri- or polyfunctional phenols, such as phloroglucinol, 4,6-dimethyl-2,4,6-tri-(4-hydroxyphenyl)-2-heptene, 4,4-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis-(4-hydroxyphenyl)cyclohexyl]propane, 2,4-bis-(4-hydroxyphenylisopropyl)phenol, tetra-(4-hydroxyphenyl)methane, 2,6-bis-(2-hydroxy-5-methylbenzyl)-4- methylphenol, 2-(4-hydroxyphenyl)-2-(2,4-dihydroxyphenyl)propane, tetra-(4-[4-hydroxyphenyl-isopropyl]phenoxy)methane, 1,4-bis[4,4'-dihydroxytriphenyl)methyl]benzene, in quantities of 0.01 to 1.0 mol. %, relative to diphenols used. Phenolic branching agents may be introduced initially with the diphenols, acid chloride branching agents may be introduced together with the acid dichlorides.

The proportion of carbonate structural units in the thermoplastic, aromatic polyester carbonates may be varied at will. The proportion of carbonate groups is preferably up to 100 mol. %, in particular up to 80 mol. %, particularly preferably up to 50 mol. %, relative to the sum of ester groups and carbonate groups. Both the ester and carbonate fractions of the aromatic polyester carbonates may be present in the form of blocks or randomly distributed in the polycondensation product.

The relative solution viscosity ($\eta_{rel}$) of the aromatic polycarbonates and polyester carbonates is in the range from 1.18 to 1.4, preferably from 1.22 to 1.3 (measured on solutions of 0.5 g of polycarbonate or polyester carbonate in 100 ml of methylene chloride solution at 25° C.).

The thermoplastic, aromatic polycarbonates and polyester carbonates may be used alone or as any desired mixture with each other.

Component B

The rubber-modified graft polymer B comprises a random (co)polymer of monomers B.1.1 and B.1.2 together with a rubber B.2 grafted with the random (co)polymer of B.1.1 and B.1.2, wherein B is produced in a known manner using a bulk or solution or bulk/suspension polymerisation process, as for example described in U.S. Pat. Nos. 3,243,481, 3,509,237, 3,660,535, 4,221,833 and 4,239,863.

Examples of monomers B.1.1 are styrene, α-methylstyrene, halo- or alkyl-ring-substituted styrenes, such as p-methylstyrene, p-chlorostyrene, (meth)acrylic acid $C_1$–$C_8$ alkyl esters such as methyl methacrylate, n-butyl acrylate and t-butyl acrylate. Examples of monomers B.1.2 are unsaturated nitriles such as acrylonitrile, methacrylonitrile, (meth)acrylic acid $C_1$–$C_8$ alkyl esters such as methyl methacrylate, n-butyl acrylate, t-butyl acrylate, derivatives (such as anhydrides and imides) of unsaturated carboxylic acids such as maleic anhydride and N-phenytmaleimide or mixtures thereof.

Preferred monomers B.1.1 are styrene, α-methylstyrene and/or methyl methacrylate, preferred monomers B.1.2 are acrylonitrile, maleic anhydride and/or methyl methacrylate.

Particularly preferred monomers are B.1.1 styrene and B.1.2 acrylonitrile.

Rubbers B.2 suitable for the rubber-modified graft polymers B are, for example, diene rubbers, EP(D)M rubbers, i.e. those based on ethylene/propylene and optionally diene, acrylate, polyurethane, silicone, chloroprene and ethylene/vinyl acetate rubbers.

Preferred rubbers B.2 are diene rubbers (for example based on butadiene, isoprene etc.) or mixtures of diene rubbers or copolymers of diene rubbers or mixtures thereof with further copolymerisable monomers (for example according to B.1.1 and B.1.2), providing that the glass transition temperature of component B.2 is <10° C., preferably <−10° C. Pure polybutadiene rubber is particularly preferred.

Component B may, if necessary and if the rubber properties of component B.2 are not consequently impaired, additionally also contain small quantities, conventionally less than 5 wt. %, preferably less than 2 wt. %, relative to B.2, of ethylenically unsaturated monomers having a crosslinking action. Examples of such monomers having a crosslinking action are alkylenediol di(meth)acrylates, polyester di(meth)acrylates, divinylbenzene, trivinylbenzene, triallyl cyanurate, allyl (meth)acrylate, diallyl maleate and diallyl fumarate.

The rubber-modified graft polymer B is obtained by graft polymerisation of 50 to 99, preferably 65 to 98, particularly preferably 75 to 97 parts by weight of a mixture of 50 to 99, preferably 60 to 95 parts by weight of monomers B.1.1 and 1 to 50, preferably 5 to 40 parts by weight of monomers B.1.2 in the presence of 1 to 50, preferably 2 to 35, particularly preferably 2 to 15, in particular 2 to 13 parts by weight of rubber component B.2, wherein graft polymerisation is performed by a bulk or solution or bulk suspension polymerisation process.

It is essential when producing the rubber-modified graft polymers B that the rubber component B.2 is present in dissolved form in the mixture of monomers B.1.1 and B.1.2 before the graft polymerisation. The rubber component B.2 must accordingly neither be so strongly crosslinked that it cannot be dissolved in B.1.1 and B.1.2, nor may B.2 already be in the form of discrete particles at the beginning of the graft polymerisation. The particle morphology and increasing crosslinking of B.2, which are important for the product properties of B, only develop during the course of the graft polymerisation (c.f. for example in this connection Ullmann, *Encyclopädie der technischen Chemie*, volume 19, pp. 284 et seq., $4^{th}$ edition 1980).

Part of the random copolymer of B.1.1 and B.1.2 is conventionally present in the polymer B in grafted form on or in the rubber B.2, wherein this graft copolymer forms discrete particles in the polymer B. The proportion of the copolymer of B.1.1 and B.1.2 so grafted relative to the entire copolymer of B.1.1 and B.1.2, i.e. the grafting yield (=weight ratio of graft monomers actually grafted to the total graft monomers used×100, stated in %) should here be 2 to 40%, preferably 3 to 30%, particularly preferably 4 to 20%.

The average particle diameter of the resultant grafted rubber particles (determined by counting on electron micrographs) is in the range from 0.5 to 5 μm, preferably from 0.8 to 2.5 μm.

Component C

Component C comprises one or more thermoplastic vinyl (co)polymers C.1. and/or polyalkylene terephthalates C.2.

Suitable (co)polymers C.1 are polymers of at least one monomer from the group of vinyl aromatics, vinyl cyanides (unsaturated nitrites), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those prepared from C.1.1 50 to 99, preferably 60 to 80 parts by weight of vinyl aromatics and/or ring-substituted vinyl aromatics such as for example styrene, α-methylstyrene, p-methylstyrene, p-chlorostyrene) and/or methacrylic acid ($C_1$–$C_8$)-alkyl esters such as for example methyl methacrylate, ethyl methacrylate) and C.1.2 1 to 50, preferably 20 to 40 parts by weight of vinyl cyanides (unsaturated nitrites) such as acrylonitrile and methacrylonitrile and/or (meth)acrylic acid ($C_1$–$C_8$)-alkyl esters (such as for example methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resinous, thermoplastic and rubber-free.

The copolymer of C.1.1 styrene and C.1.2 acrylonitrile is particularly preferred.

The (co)polymers C.1 are known and may be produced by free-radical polymerisation, in particular by emulsion, suspension, solution or bulk polymerisation. The (co) polymers preferably have molecular weights $\overline{M}_w$ (weight average, determined by light scattering or sedimentation) of between 15000 and 200000.

The component C.2 polyalkylene terephthalates are reaction products of aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol. %, relative to the diol component, of ethylene glycol and/or 1,4-butanediol residues.

In addition to terephthalic acid residues, the preferred polyalkylene terephthalates may contain up to 20 mol. %, preferably up to 10 mol. %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 2,6-naphthalenedicarboxylic acid, 4,4'-diphenyldicarboxylic acid, succinic acid, adipic acid, sebacic acid, azelaic acid, cyclohexanediacetic acid.

In addition to ethylene glycol or 1,4-butanediol residues, the preferred polyalkylene terephthalates may contain up to 20 mol. %, preferably up to 10 mol. %, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy) benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2-bis-(4-hydroxypropoxyphenyl)propane (DE-OS 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-OS 1 900 270 and U.S. Pat. No. 3,692,744. Examples of further preferred branching agents are trimesic acid, trimellitic acid, trimethylolethane and trimethylolpropane and pentaerythritol.

Particularly preferred polyalkylene terephthalates are those solely produced from terephthalic acid and the reactive derivatives thereof (for example the diaklkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in a Ubbelohde viscosimeter.

The polyalkylene terephthalates may be produced using known methods (c.f. for example *Kunststoff-Handbuch*, volume VIII, pp. 695 et seq., Carl Hanser Verlag, Munich 1973).

Component D

Component D phosphazenes which are used according to the present invention are linear phosphazenes of the formula (Ia) and cyclic phosphazenes of the formula (Ib)

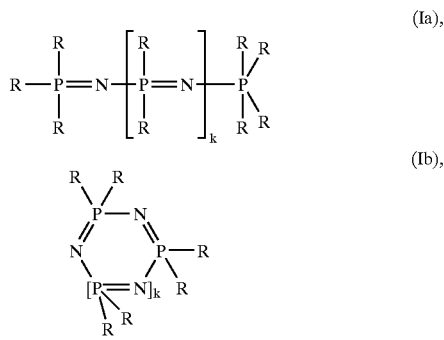

wherein

R and k have the above-stated meaning.

The following may be mentioned by way of example: propoxyphosphazene, phenoxyphosphazene, methylphenoxyphosphazene, aminophosphazene and fluoroalkylphosphazenes.

Phenoxyphosphazene is preferred.

The phosphazenes may be used alone or as a mixture. The residue R may always be identical or two or more residues in the formula (Ia) and (Ib) may be different.

The phosphazenes and the production thereof are described, for example, in EP-A 728 811, DE-A 1 961 668 and WO 97/40092.

Component E

The fluorinated polyolefins E are of a high molecular weight and have glass transition temperatures of above −30° C., generally of above 100° C., fluorine contents preferably of 65 to 76, in particular of 70 to 76 wt. %, average particle diameters $d_{50}$ of 0.05 to 1000, preferably of 0.08 to 20 μm. The fluorinated polyolefins E preferably have a density of 1.2 to 2.3 g/cm³. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (c.f. *Vinyl & Related Polymers* by Schildknecht, John Wiley & Sons Inc., New York, 1962, pp. 484–494; *Fluoropolymers* by Wall, Wiley-Interscience, John Wiley & Sons Inc., New York, volume 13, 1970, pp. 623–654; *Modern Plastics Encyclopedia,* 1970–1971, volume 47, no. 10 A, October 1970, McGraw-Hill Inc., New York, pp. 134 and 774; *Modern Plastic Encyclopedia,* 1975–1976, October 1975, volume 52, no. 10A, McGraw-Hill Inc., New York, pp. 27, 28 and 472 and U.S. Pat. Nos. 3,671487, 3,723,373 and 3,838,092).

They may be produced using known processes, thus for example by polymerising tetrafluoroethylene in an aqueous medium with a free-radical forming catalyst, for example sodium, potassium or ammonium peroxydisulfate, at pressures of 7 to 71 kg/cm² and at temperatures of 0 to 200° C., preferably at temperatures of 20 to 100° C. (c.f. for example U.S. Pat. No. 2,393,967 for further details). Depending upon the form in which they are used, the density of these materials may be between 1.2 and 2.3 g/cm³, the average particle size between 0.5 and 1000 μm.

Polyolefins E preferred according to the invention are tetrafluoroethylene polymers having average particle diameters of 0.05 to 20 μm, preferably of 0.08 to 10 μm, and a density of 1.2 to 1.9 g/cm³ and are preferably used in the form of a coagulated mixture of emulsions of tetrafluoroethylene polymers E with emulsions of a graft polymer.

Suitable polyolefins E usable in powder form are tetrafluoroethylene polymers having average particle diameters of 100 to 1000 μm and densities of 2.0 g/cm$^3$ to 2.3 g/cm$^3$.

A coagulated mixture of a graft polymer B and component E is produced by firstly mixing an aqueous emulsion (latex) of a graft polymer B with a finely divided emulsion of a tetraethylene polymer E; suitable tetrafluoroethylene polymer emulsions conventionally have solids contents of 30 to 70 wt %, in particular of 50 to 60 wt. %, preferably of 30 to 35 wt. %.

The equilibrium weight ratio of graft polymer to tetrafluoroethylene polymer E in the emulsion mixture is 95:5 to 60:40. The emulsion mixture is then coagulated in a known manner, for example by spray drying, freeze drying or coagulation by addition of inorganic or organic salts, acids, bases or organic, water-miscible solvents, such as alcohols, ketones, preferably at temperatures of 20 to 150° C., in particular of 50 to 100° C. If necessary, drying may be performed at 50 to 200° C., preferably at 70 to 100° C.

Suitable tetrafluoroethylene polymer emulsions are conventional commercial products and are offered for sale, for example, by DuPont as Teflon® 30 N.

The moulding compositions according to the invention may contain at least one of the conventional additives, such as lubricants and mould release agents, nucleating agents, anti-static agents, stabilisers as well as dyes and pigments.

The moulding compositions according to the invention may contain up to 35 wt. %, relative to the overall moulding composition, of a further, optionally synergistic flame retardant. Examples of further flame retardants which may be mentioned are organic halogen compounds, such as decabromobisphenyl ether, tetrabromobisphenol, inorganic halogen compounds such as ammonium bromide, nitrogen compounds, such as melamine, melamine/formaldehyde resins, inorganic hydroxide compounds, such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon oxide and tin oxide, as well as siloxane compounds.

The moulding compositions according to the invention containing components A to E and optionally further known additives such as stabilisers, dyes, pigments, lubricants and mould release agents, nucleating agents, as well as anti-static agents, are produced by mixing the particular constituents in a known manner and melt-compounding and melt-extruding them at temperature of 200° C. to 300° C. in conventional units such as internal kneaders, extruders and twin-screw extruders, wherein component E is preferably used in the form of the above-mentioned coagulated mixture.

The individual constituents may be mixed in a known manner both in succession and simultaneously and both at approx. 20° C. (room temperature) and at a higher temperature.

The present invention accordingly also provides a process for the production of the moulding compositions.

By virtue of their excellent flame resistance and good mechanical properties, the thermoplastic moulding compositions according to the invention are suitable for the production of mouldings of all kinds, in particular those having severe requirements with regard to processing behaviour.

Such applications include components of a complicated structure having two or more injection points and thin-walled casing parts having wall thicknesses of <2 mm, preferably of <1.5 mm.

The moulding compositions of the present invention may be used for the production of mouldings of any kind. Mouldings may in particular be produced by injection moulding. Examples of mouldings which may be produced are: casings of all kinds, for example for domestic appliances such as juice extractors, coffee machines, food mixers, for office equipment, such as monitors, printers, copiers or cladding sheet for the building sector and automotive components. They may also be used in electrical engineering applications as they have very good electrical properties.

Another processing method is the production of mouldings by thermoforming of previously produced sheet or film.

The present invention accordingly also provides the use of the moulding compositions according to the invention for the production of mouldings of all kinds, preferably those stated above, and the mouldings made from the moulding compositions according to the invention.

The moulding compositions according to the invention may furthermore, for example, be used to produce the following mouldings or shaped articles:

Interior trim for rail vehicles (FR)
Hub-caps
Casings for electrical devices containing small transformers
Casings for information dissemination and transmission devices
Casings and cladding for medical purposes
Massage devices and casings therefor
Toy vehicles for children
Sheet wall elements
Casings for safety equipment
Hatchback spoilers
Thermally insulated transport containers
Apparatus for keeping or caring for small animals
Mouldings for sanitary and bathroom installations
Cover grilles for ventilation openings
Mouldings for summer houses and sheds
Casings for garden appliances.

EXAMPLES

Component A

Linear bisphenol A based polycarbonate having a relative solution viscosity of 1.26, measured in $CH_2Cl_2$ as solvent at 25° C. and a concentration of 0.5 g/100 ml.

Component B

B.1 Bulk ABS polymer from DOW Chemical Company, Midland, Mich., USA (trade name Magnum 3504) Acrylonitrile:butadiene:styrene=22.0:10.2:67.8

B.2 Comparison Graft polymer of 40 parts by weight of a copolymer of styrene and acrylonitrile in a 73:27 ratio on 60 parts by weight of crosslinked particulate polybutadiene rubber (average particle diameter $d_{50}$=0.28 μm), produced by emulsion polymerisation.

Component C

Styrene/acrylonitrile copolymer having a styrene/acrylonitrile weight ratio of 72:28 and an intrinsic viscosity of 0.55 dl/g (measured in dimethylformamide at 20° C.).

Component D
Phenoxyphosphazene of the formula

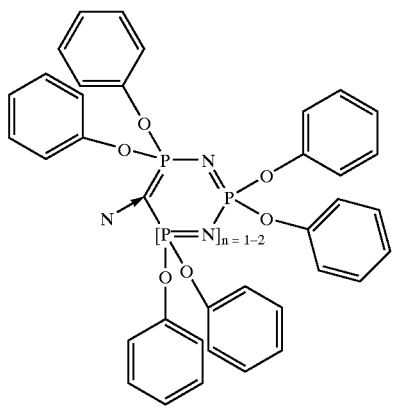

Commercial product P-3800 from Nippon Soda Co. Ltd., Japan.

Pentaerythritol tetrastearate is used as mould release agent.

Component E

Tetrafluoroethylene polymer as a coagulated mixture prepared from an SAN graft polymer emulsion (graft polymer of 40 parts by weight of a copolymer of styrene and acrylonitrile in a 73:27 ratio on 60 parts by weight of particulate, crosslinked polybutadiene rubber, produced by emulsion polymerisation, average particle diameter $d_{50}$= 0.28 µm) in water and a tetrafluoroethylene polymer emulsion in water. The weight ratio of graft polymer B to the tetrafluoroethylene polymer E in the mixture is 90 wt. %: 10 wt. %. The tetrafluoroethylene polymer has a solids content of 60 wt. %, the average particle diameter is between 0.05 and 0.5 µm. The SAN graft polymer emulsion has a solids content of 34 wt. % and an average latex particle diameter of $d_{50}$=0.28 µm.

Production of E

The emulsion of the tetrafluoroethylene polymer (Teflon 30 N from DuPont) is mixed with the emulsion of the SAN graft polymer B and stabilised with 1.8 wt %, relative to polymer solids, of phenolic anti-oxidants. At 85 to 95° C., the mixture is coagulated at pH 4 to 5 with an aqueous solution of $MgSO_4$ (Epsom salts) and acetic acid, filtered and washed until virtually free of electrolytes, then the principal quantity of water is removed by centrifugation and the material then dried at 100° C. to yield a powder. This powder may be compounded with the other components in the units described.

Production and Testing of the Moulding Compositions According to the Invention

The components are mixed in a 3 liter internal kneader. The mouldings are produced at 260° C. on an Arburg model 270 E injection moulding machine.

The Vicat B softening point is determined to DIN 53 460 (ISO 306) on bars of dimensions 80×10×4 mm.

Stress cracking behaviour (ESC behaviour) was investigated on bars of dimensions 80×10×4 mm, processing temperature 260° C. The test medium used was a mixture of 60 vol. % toluene and 40 vol. % isopropanol. The test pieces were pre-stressed on a circular arc template (initial elongation in percent) and immersed in the test medium at room temperature. Stress cracking behaviour was evaluated on the basis of cracking or failure as a function of initial elongation in the test medium.

Thermogravimetric analysis (TGA) is used as a measure of the formation of deposits on the mould. To this end, the loss in mass of the mixtures was determined under $N_2$ as an inert gas in the temperature range from 0 to 400° C. with a heating rate of 10 K/min. The loss in mass at a temperature of 280° C., corresponding to conventional processing temperatures, was used for evaluation purposes. The higher is the numerical value, the greater is the tendency towards the formation of deposits during processing. Low values indicate a low tendency towards the formation of deposits.

TABLE

| | Moulding compositions and properties thereof (stated in parts by weight) | | | | |
|---|---|---|---|---|---|
| | 1 | 2 | 3 | 4 | 5 (Comp.) |
| Components | | | | | |
| A | 66.7 | 66.7 | 60.7 | 75.0 | 66.7 |
| B1 | 16.7 | 14.2 | 16.7 | 10.4 | — |
| B2 | — | — | — | — | 7.3 |
| C | — | 2.0 | — | — | 9.4 |
| D | 12.0 | 12.0 | 18.0 | 10.0 | 12.0 |
| E | 4.2 | 4.2 | 4.2 | 4.2 | 4.2 |
| Mould release agent | 0.4 | 0.4 | 0.4 | 0.4 | 0.4 |
| Properties | | | | | |
| ak (ISO 180/1A) [kJ/m$^2$] | 55 | 54 | 53 | 58 | 54 |
| Vicat B 120 [° C.] | 108 | 108 | 99 | 105 | 107 |
| UL 94 V, 1.6 mm | V-0 | V-0 | V-0 | V-0 | V-0 |
| ESC behaviour, failure at $\epsilon_x$ (%) | 2.4 | 2.4 | 2.0 | 2.4 | 2.2 |
| MVR (240/5), ISO 1133 (cm$^3$10 min) | 13.6 | 15.3 | 26.6 | 10.3 | 8.4 |
| TGA Loss in mass at 280° C. (%) | 0.56 | 0.55 | 0.57 | 0.51 | 0.75 |

The moulding compositions according to the invention are distinguished by a favourable combination flame resistance and mechanical properties. Moreover, there is the surprising finding that moulding compositions containing the bulk ABS exhibit further advantages with regard to processing. Both flow behaviour (MVR) and loss in mass, which may be considered a measure of the formation of deposits which occurs under processing conditions, arc distinctly more favourable (approx. 20%) than in moulding compositions containing emulsion ABS.

What is claimed is:

1. A thermoplastic moulding composition containing:

A) 40 to 99 parts by weight of at least one of aromatic polycarbonate and polyester carbonate;

B) 0.5 to 60 parts by weight of graft polymer produced by a process selected from the group consisting of bulk polymerisation, solution polymerisation and bulk/suspension polymerisation of B.1) 65 to 98 wt. % of one or more vinyl monomers, and B.2) 2 to 35 wt. % of one or more grafting backbones having a glass transition temperature of <10° C., said graft polymer having an average particle diameter of 0.5 to 5 µm, and a grafting yield of 2 to 40%;

C) 0 to 45 parts by weight of at least one thermoplastic polymer selected from the group consisting of vinyl (co)polymers and polyalkylene terephthalates;

D) 0.1 to 50 parts by weight of at least one component selected from the group consisting of phosphazenes represented by the formulae,

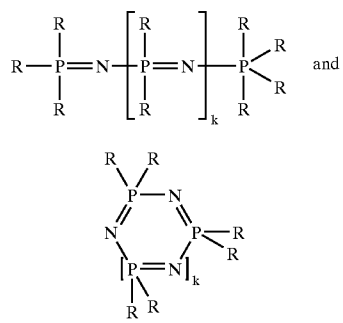

in which
R is in each case identical or different and denotes at least one of amino, $C_1$ to $C_6$ alkyl, in each case optionally halogenated, $C_1$ to $C_8$ alkoxy, $C_5$ to $C_6$ cycloalkyl, $C_6$ to $C_{20}$ aryl, $C_6$ to $C_{20}$ aryloxy, $C_7$ to $C_{12}$ aralkyl, in each case optionally substituted by at least one of alkyl, and halogen,
k denotes 0 or a number from 1 to 15; and
E) 0 to 5 parts by weight of fluorinated polyolefin.

2. The moulding composition of claim 1 containing:
60 to 98.5 parts by weight of A;
1 to 40 parts by weight of B;
0 to 30 parts by weight of C;
2 to 35 parts by weight of D; and
0.1 to 1 part by weight of E.

3. The moulding composition of claim 1 containing 2 to 25 parts by weight of C.

4. The moulding composition of claim 1 containing 5 to 25 parts by weight of D.

5. The moulding composition of claim 1 wherein vinyl monomers B.1 are mixtures prepared from B.1.1 a first vinyl monomer selected from at least one of styrene, α-methylstyrene, halo- or alkyl-ring-substituted styrenes and (meth)acrylic acid $C_1$–$C_8$ alkyl esters, and B.1.2 a second vinyl monomer selected from at least one of unsaturated nitriles, (meth)acrylic acid $C_1$–$C_8$ alkyl esters and derivatives of unsaturated carboxylic acids.

6. The moulding composition of claim 1 wherein the grafting backbone B.2 is at least one rubber selected from the group consisting of diene rubbers, EP(D)M rubbers, acrylate, polyurethane, silicone, chloroprene and ethylene/vinyl acetate rubber.

7. The moulding composition of claim 1 containing at least one additive selected from the group consisting of lubricants, mould release agents, nucleating agents, antistatic agents, stabilisers, dyes and pigments.

8. The moulding composition of claim 1 containing further flame retardants which differ from component D.

9. A molded article comprising the composition of claim 1.

10. The thermoplastic moulding composition of claim 1 wherein graft polymer B) is prepared by bulk polymerization.

11. The thermoplastic moulding composition of claim 1 wherein graft polymer B) has an average particle diameter of 0.8 to 2.5 μm.

12. The thermoplastic moulding composition of claim 1 wherein graft polymer B) is produced by polymerization of 75 to 97 wt. % of B.1), and 2 to 15 wt. % of B.2).

13. The thermoplastic moulding composition of claim 1 wherein said graft copolymer B) has a grafting yield of 3 to 30%.

14. The thermoplastic moulding composition of claim 1 wherein said graft copolymer B) has a grafting yield of 4 to 20%.

* * * * *